(12) United States Patent
Bellebono et al.

(10) Patent No.: US 11,076,586 B2
(45) Date of Patent: Aug. 3, 2021

(54) GUIDING DEVICE FOR FISHING RODS

(71) Applicant: VAL MAR S.R.L., Cividate al Piano (IT)

(72) Inventors: Alessandro Bellebono, Cividate al Piano (IT); Giuliano Giorgi, Ome (IT)

(73) Assignee: VAL MAR S.R.L., Cividate al Piano (IT)

(*) Notice: Subject to any disclaimer, the term of this patent is extended or adjusted under 35 U.S.C. 154(b) by 0 days.

(21) Appl. No.: 16/094,801

(22) PCT Filed: Feb. 21, 2018

(86) PCT No.: PCT/IB2018/051065
§ 371 (c)(1),
(2) Date: Oct. 18, 2018

(87) PCT Pub. No.: WO2018/131006
PCT Pub. Date: Jul. 19, 2018

(65) Prior Publication Data
US 2020/0323186 A1    Oct. 15, 2020

(30) Foreign Application Priority Data
Feb. 23, 2017   (IT) ................... 102017000020303

(51) Int. Cl.
*A01K 87/04*    (2006.01)

(52) U.S. Cl.
CPC .................... *A01K 87/04* (2013.01)

(58) Field of Classification Search
CPC ........................................... A01K 87/04
USPC ................................................ 43/24
See application file for complete search history.

(56) References Cited

U.S. PATENT DOCUMENTS

| | | | |
|---|---|---|---|
| 2,878,608 A * | 3/1959 | O'Brien, Jr. | A01K 87/04 43/24 |
| 3,350,809 A | 11/1967 | Chion | |
| 4,428,141 A | 1/1984 | Kovalovsky | |
| 5,531,041 A * | 7/1996 | Betto | A01K 87/04 43/24 |
| 2006/0090388 A1* | 5/2006 | Lee | A01K 87/04 43/24 |

(Continued)

OTHER PUBLICATIONS

International Search Report dated Jul. 2, 2018 re: Application No. PCT/IB2018/051065, pp. 1-3, US 2013/097914 A1, US 4 128 141 A and US 3 350 809 A.

(Continued)

*Primary Examiner* — Darren W Ark
*Assistant Examiner* — Kari A Bradberry
(74) *Attorney, Agent, or Firm* — Cantor Colburn LLP (57) ABSTRACT

A guiding device for fishing rod lines, the guiding device includes a supporting body for at least one guiding roller which is mounted so that the at least one guiding roller can rotate with respect to the supporting body about an axis of the roller. The guiding device further includes two elements for fixing to the shaft of a fishing rod, which are arranged substantially at right angles to the axis of the roller on opposite sides with respect to the supporting body. The guiding device further includes a kinematic connection device between the supporting body and at least one of the two elements for fixing, which is adapted to allow two degrees of freedom between the supporting body and at least one of the elements for fixing.

9 Claims, 7 Drawing Sheets

(56) References Cited

U.S. PATENT DOCUMENTS

2011/0067291 A1* 3/2011 Lin .................. A01K 87/04
                                                    43/24
2013/0097914 A1* 4/2013 Barber ............. A01K 87/04
                                                    43/24
2019/0159438 A1* 5/2019 Stirling ............ A01K 87/04

OTHER PUBLICATIONS

IT Search Report dated Oct. 30, 2017 re: Application No. IT 201700020303, pp. 1-8, US 2013/097914 A1, US 4 428 141 A and US 3 350 809 A.
Written Opinion dated Jul. 2, 2018 re: Application No. PCT/IB2018/051065, pp. 1-7, US 2013/097914 A1, US 4 428 141 A and US 3 350 809 A.

* cited by examiner

Fig. 7

GUIDING DEVICE FOR FISHING RODS

TECHNICAL FIELD

The present disclosure relates to a guiding device for fishing rod lines.

BACKGROUND

Fishing rods, and in particular fishing rods used for deep-sea fishing, have guiding devices along the shaft of the rod for guiding the line unwound from the reel.

Such guiding devices comprise a body which defines a pair of side walls for supporting one or two guiding rollers so as to provide, with the side walls, the ports for the line to pass through.

The body is provided in a single piece with a pair of supporting feet.

Traditionally, the fixing of the guiding devices to the shaft of the rod occurs by placing the supporting feet on the shaft of the rod in a longitudinal arrangement and winding a plurality of turns of thread on the assembly and spreading a layer of hardening resin on the windings.

The technology for providing shafts from composite material, which is continuously evolving, enables the provision of rods with increasingly higher performance levels from the point of view of elastic response, thus ensuring an increase in flexibility and therefore better reactivity when fighting with the fish.

Therefore customers have a wide range to choose from when selecting a shaft on the basis of their personal aptitude to fishing.

A problem that all guiding devices on the market exhibit, once they are fixed along the shaft, is the considerable alteration of the elastic response of the shaft proper.

Effectively, the customer chooses the shaft before affixing the guiding devices but, after the guiding devices are applied to the shaft, the rod completely changes its mechanical characteristics and elastic response.

In fact, at the portions of the shaft on which the guiding devices are fixed, a rigid bridge is created, and such portions consequently lose the elastic characteristics of the high-technology composite of which the shaft is made, insofar as they acquire the rigidity of the metal structure with which the guiding devices are made.

This aspect determines a reduction of up to 30-40% of the elastic potential of the rod.

U.S. Pat. No. 5,800,759 relates to a process for making a decorated object by thermoforming and trimming a film and injection molding plastic material onto the trimmed film.

Furthermore the high difference in modulus of elasticity between the supporting feet of the guiding device (which are made of metal and in particular of aluminum) and the composite shaft leads, when the rod bends with significant angles at the limit of elastic deformation, to breakage of the limit zone where the supporting foot and the structure are joined.

SUMMARY

The aim of the present disclosure is to provide a guiding device for fishing rod lines that is capable of improving the known art in the above mentioned aspects.

Within this aim, the disclosure provides a guiding device for fishing rod lines that enables the fishing rod to maintain the elastic response of the fishing rod substantially unaltered during its bending.

The disclosure reduces the risk of breakage of the guiding device, including as a consequence of extreme bending stresses.

The disclosure also provides a guiding device for fishing rod lines that is highly reliable, easy to implement and low cost.

This aim and these and other advantages which will become better apparent hereinafter are achieved by providing a guiding device for fishing rod lines according to claim 1.

BRIEF DESCRIPTION OF THE DRAWINGS

Further characteristics and advantages of the disclosure will become better apparent from the description of some preferred, but not exclusive, embodiments of the guiding device for fishing rod lines according to the disclosure, which are illustrated for the purposes of non-limiting example in the accompanying drawings wherein.

DETAILED DESCRIPTION OF THE DRAWINGS

With reference to FIGS. 1-7, the guiding device for fishing rod lines according to the disclosure, generally designated by the reference numeral 1, comprises a supporting body 2 for at least one guiding roller 5 which is mounted so that it can rotate with respect to the supporting body 2 about an axis of the roller 100, and two elements for fixing 3 to the shaft of a fishing rod, which are arranged substantially at right angles to the axis of the roller 100 on opposite sides with respect to the supporting body 2.

Advantageously the two elements for fixing 3 have a portion for coupling 3a to the shaft of the fishing rod.

The portions for coupling 3a are arranged on opposite sides with respect to the guiding roller or rollers 5.

According to the present disclosure, the guiding device 1 comprises a kinematic connection device 10 between the supporting body 2 and at least one of the two elements for fixing 3.

In particular, the kinematic connection device 10 is adapted to allow two degrees of freedom between the supporting body 2 and at least one of the elements for fixing 3.

Conveniently, the kinematic connection device 10 comprises means of combined rotation and translation of the supporting body 2 with respect to the respective element for fixing 3.

According to a practical embodiment, the means of combined rotation and translation are adapted to allow a rotation about an articulation axis 101 that is substantially parallel to the axis of the roller 100, and a translation along a trajectory 200 that lies on a plane that is substantially perpendicular to the axis of the roller 100.

According to a preferred embodiment shown in the figures, the kinematic connection device 10 comprises an articulation pivot 11, which is connected to the supporting body 2 and extends substantially parallel to the axis of the roller 100.

The articulation pivot 11 can slide along a sliding guide 12.

The sliding guide 12 is defined on the respective element for fixing 3.

Conveniently the sliding guide 12 is provided by a slot 12a.

There is no reason why the articulation pivot 11 cannot be supported by the element for fixing 3 and the sliding guide 12, and in particular the slot 12a, cannot be defined by the supporting body 2.

Advantageously, the guiding device 1 comprises a first and a second kinematic connection device 10 which are arranged, respectively, between the supporting body 2 and a respective element for fixing 3.

Such solution makes it possible to follow the bending of the shaft by reducing (effectively halving) the length of the trajectory 200.

According to a possible variation of embodiment, the kinematic connection device 10 comprises at least one pair of linkages for connection between the supporting body 2 and the respective element for fixing 3.

With reference to the embodiment shown in the figures, the supporting body 2 comprises two side walls 2a, 2b.

Furthermore, the guiding device 1 is provided with at least one axle 5a which can be associated detachably with the two side walls 2a, 2b.

The shaft or each axle 5a extends substantially perpendicular to the planes of arrangement of the two side walls 2a, 2b.

The guiding roller 5 is mounted so that it can rotate on a respective axle 5a.

For this reason, conveniently bearings 5b are interposed between the axle 5a and the guiding roller 5.

The fixing of the axle 5a to the side walls 2a and 2b can be done by way of end screws 6 which have a widened head 6a designed to abut against an abutment body 8 which can be associated stably (or defined) in a respective side wall 2a, 2b, and a threaded shank 6b designed to be screwed into a female thread 5c which is defined at the end of the axle 5a.

The articulation pivot or pivots 11 can also be detachably connected, for example in the same way, to the side walls 2a, 2b.

Specifically, there are the locking screws 7 which have a widened end 7a and a threaded portion 7b that can be engaged in an end portion with a female thread 5c defined on the axle 5a.

The guiding device 1 can support, as shown in the figures, one or more guiding rollers 5.

Figure 1:
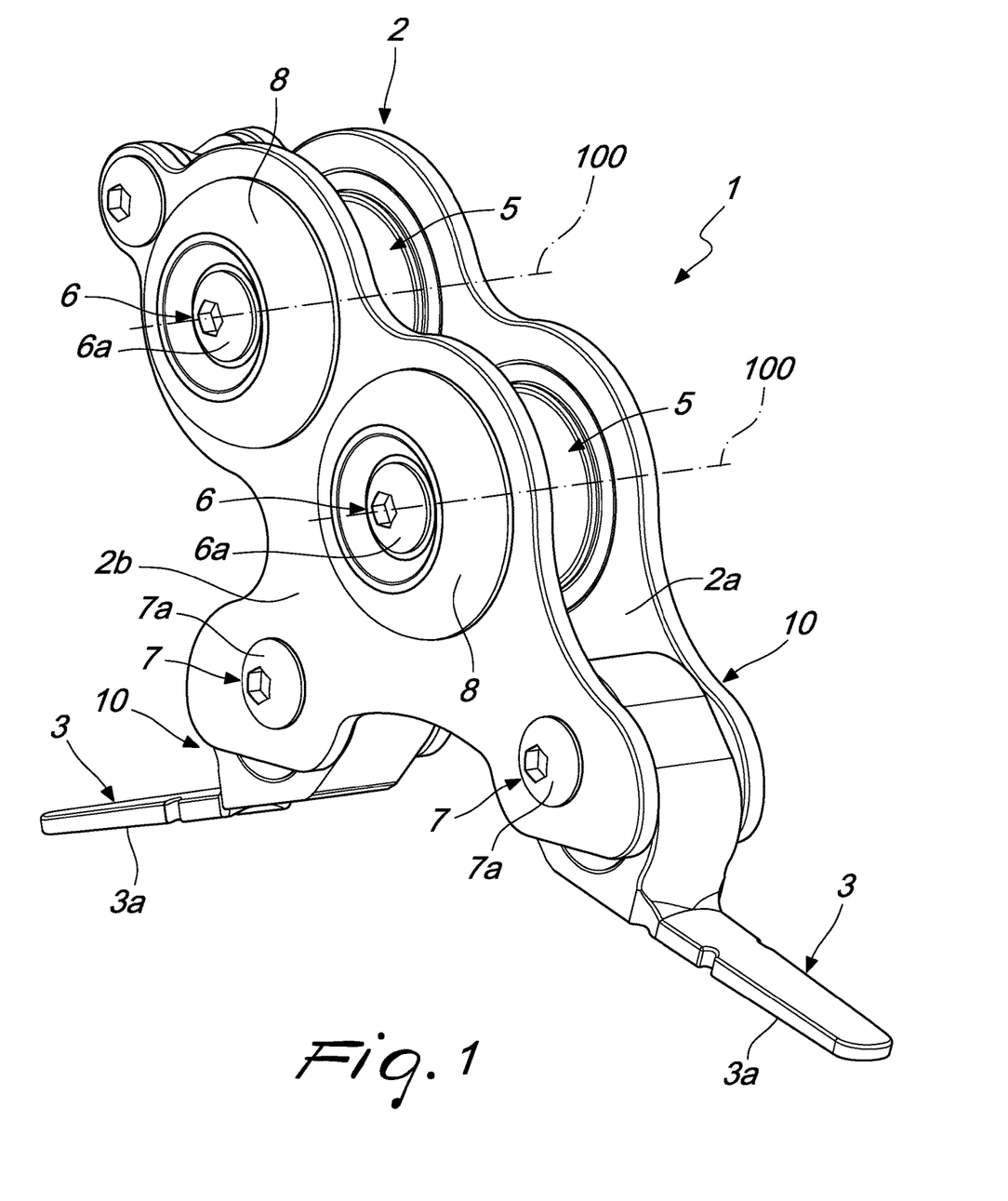
FIG. 1 is a perspective view of a first embodiment of the guiding device according to the disclosure.
Figure 2:
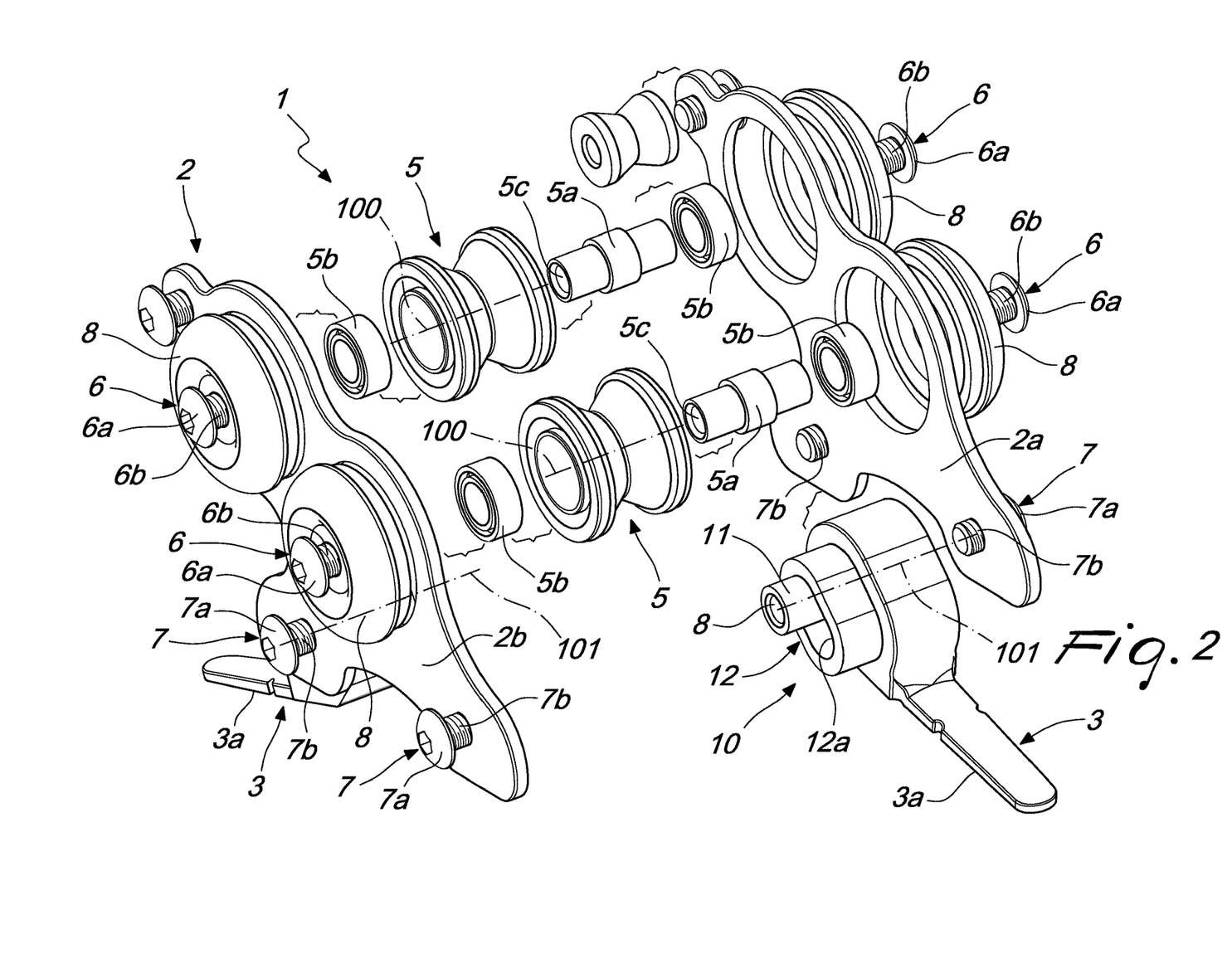
FIG. 2 is an exploded perspective view of the first embodiment of the guiding device.
Figure 3:
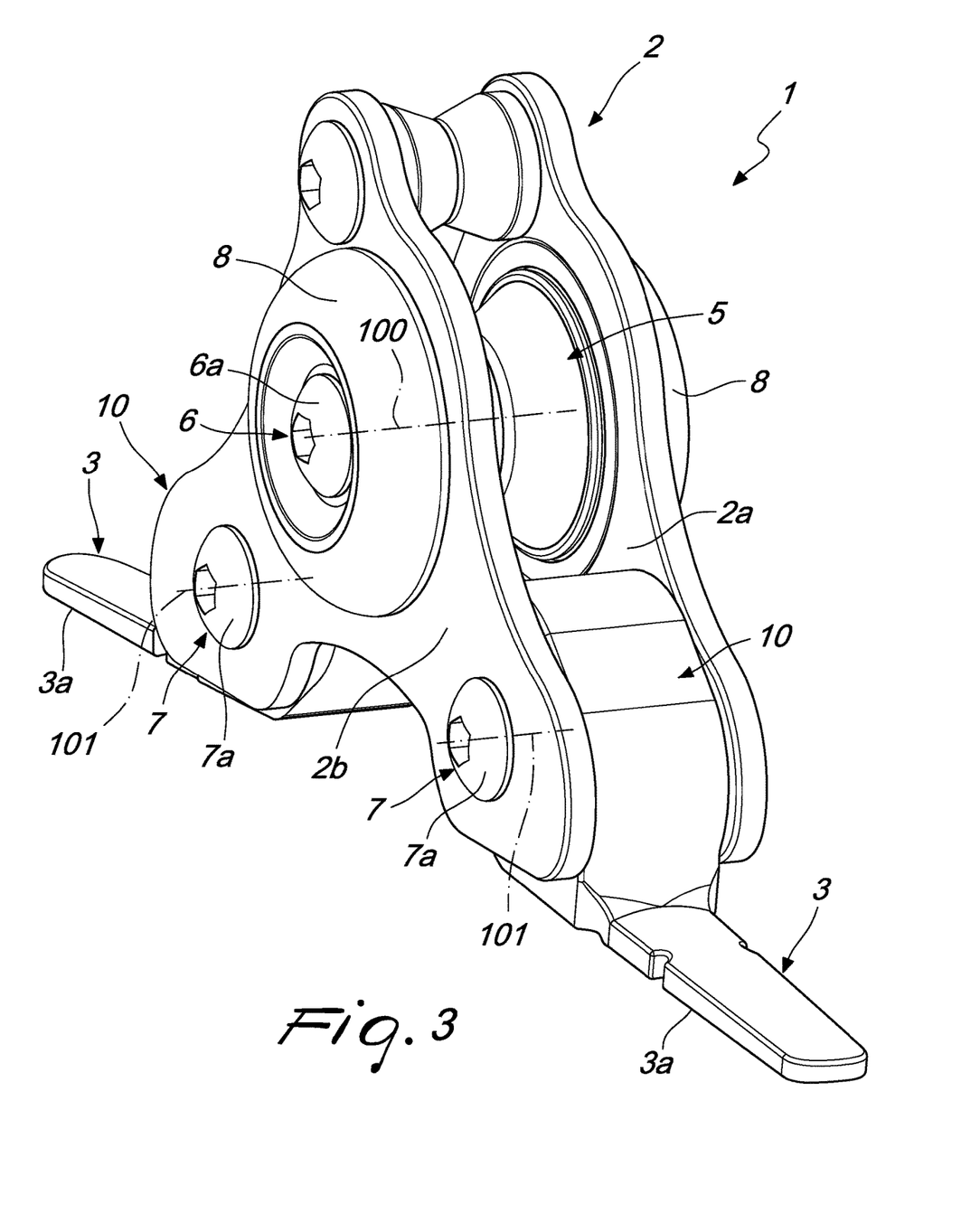
FIG. 3 is a perspective view of a variation of embodiment of the guiding device according to the disclosure.
Figure 4:
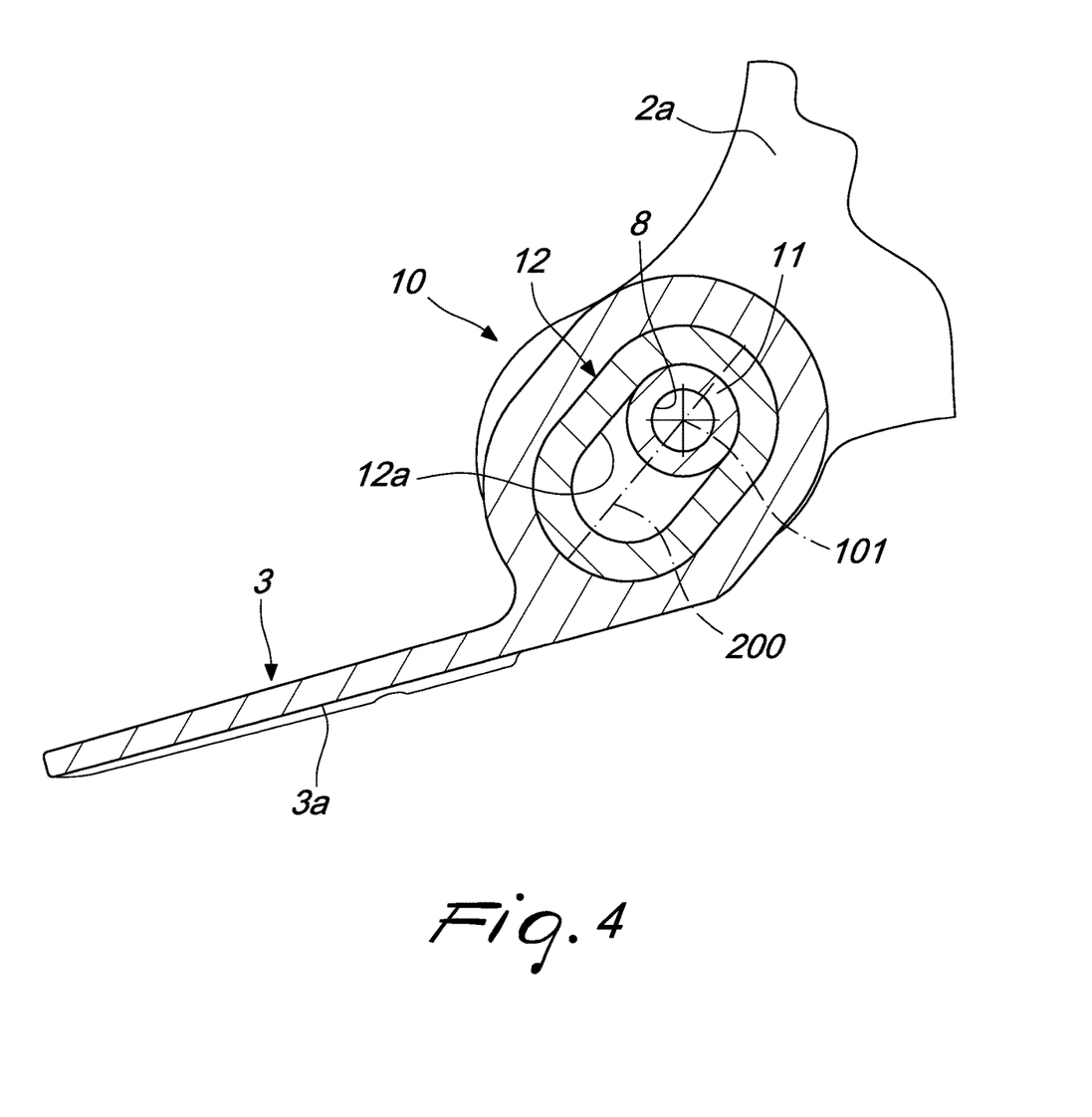
FIG. 4 is a cross-sectional view, taken along a plane substantially perpendicular to the axis of the roller, of the kinematic connection device.
Figure 5:
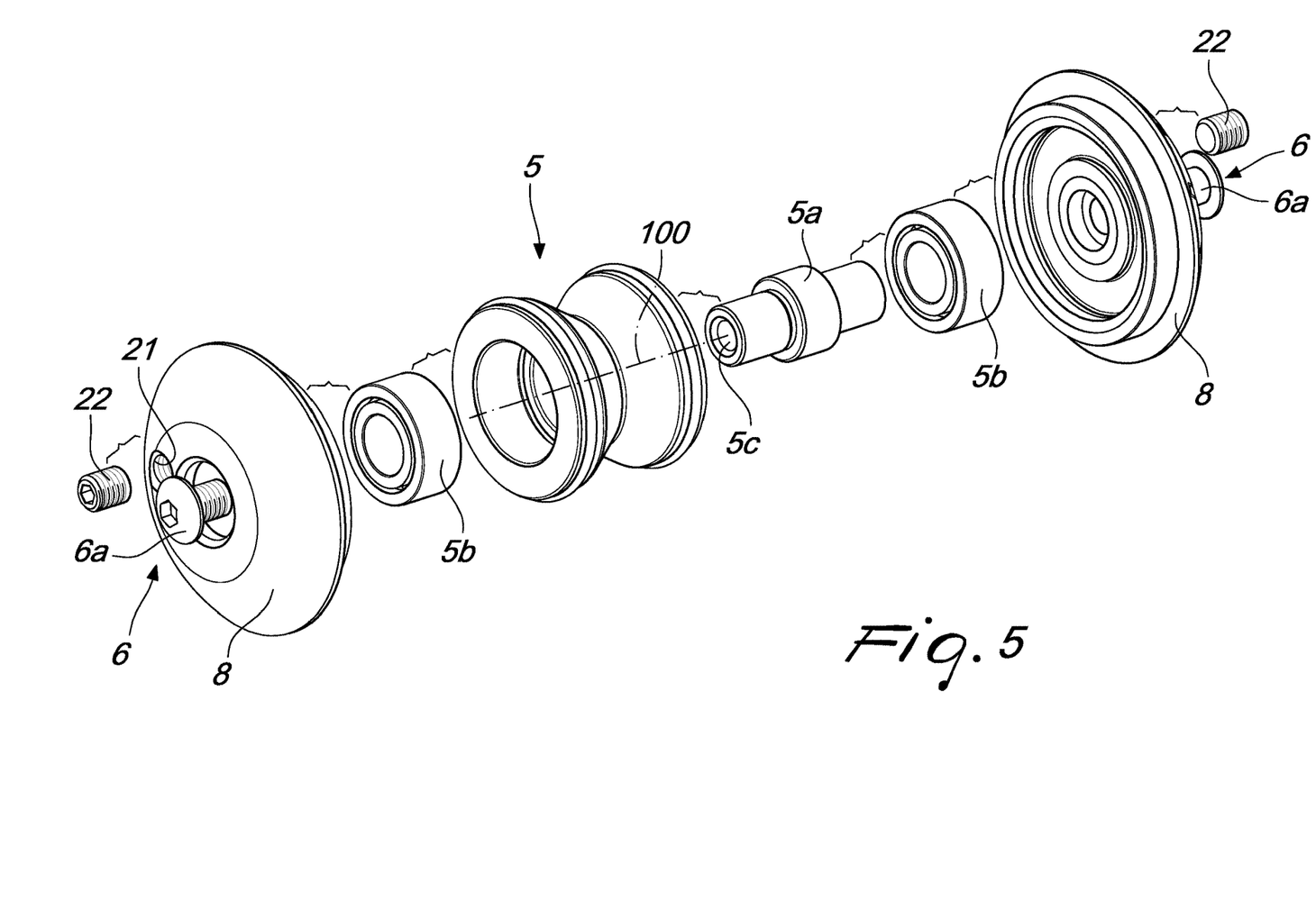
FIG. 5 is an exploded perspective view of a variation of embodiment of a portion of the guiding device.
Figure 6:
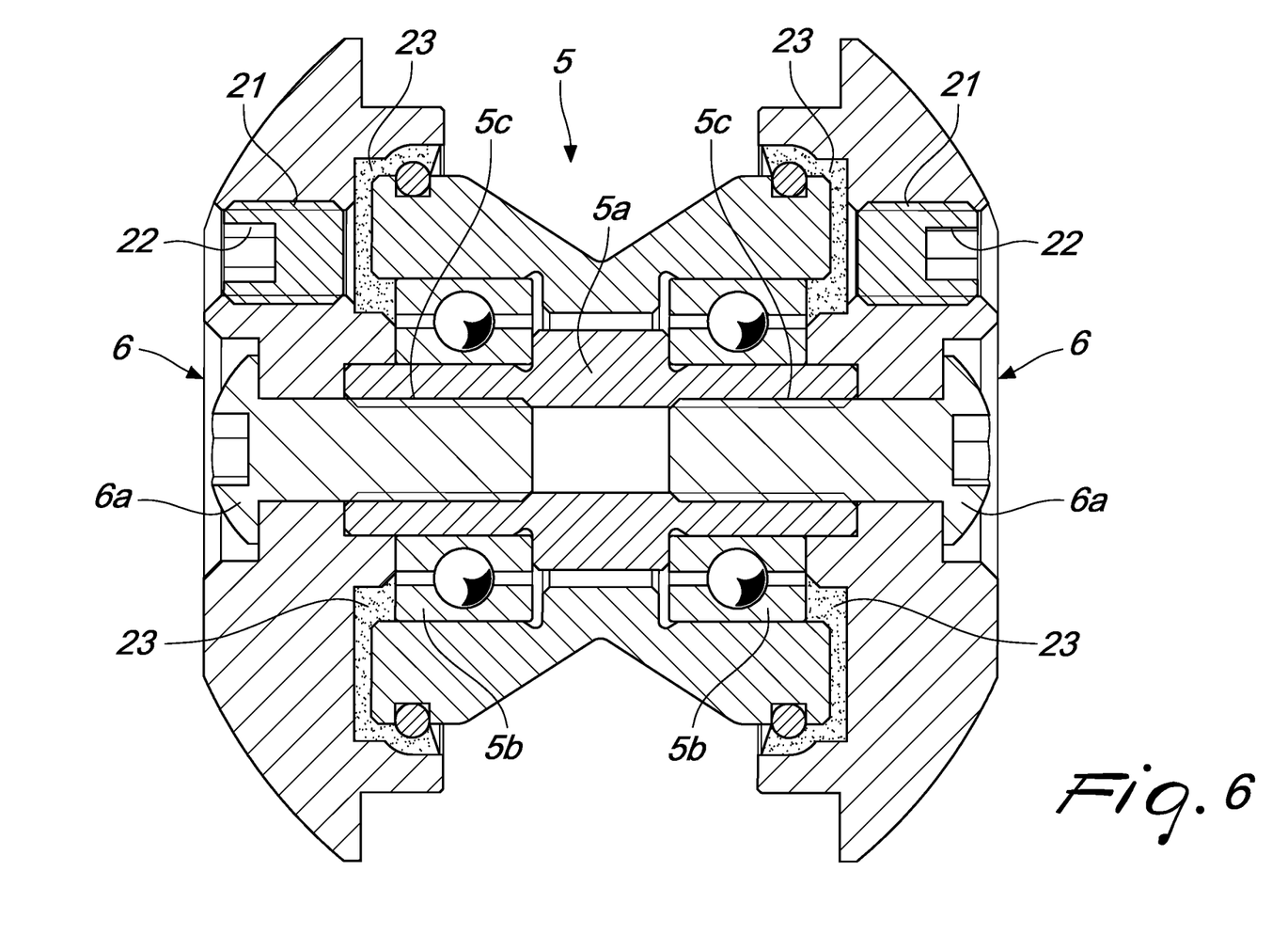
FIG. 6 is a diametrical cross-sectional view of the portion of the guiding device shown in FIG. 5.

With reference to the embodiment shown in FIGS. 5 and 6, at least one abutment body 8 defines at least one passthrough opening 21 which can be closed by a closure body 22.

Advantageously, both of the abutment bodies 8 arranged on opposite sides with respect to the guiding roller 5 define at least one respective passthrough opening 21.

Preferably, the passthrough opening 21 is defined by a hole with a female thread and the closure body 22 by a grub screw that can be screwed into and unscrewed from the hole with a female thread.

Each passthrough opening 21 leads into a lubrication chamber 23 which is in contact with at least one bearing 5b.

The lubrication chamber 23, which can be accessed from outside by way of removing the closure body 22, makes it possible to protect the bearings 5b from salt water.

Such solution makes it possible, after removing the closure body 22, to lubricate the lubrication chamber 23 by introducing lubricant, such as for example grease, inside, through the respective passthrough opening 21.

Such operation can therefore be carried out in an extremely simple manner without the need to dismount the guiding device.

According to a further aspect, the present disclosure furthermore relates to a fishing rod which comprises a shaft which is associated, substantially at a first end, with a reel and, substantially at the opposite end, with a tip element.

Figure 7:
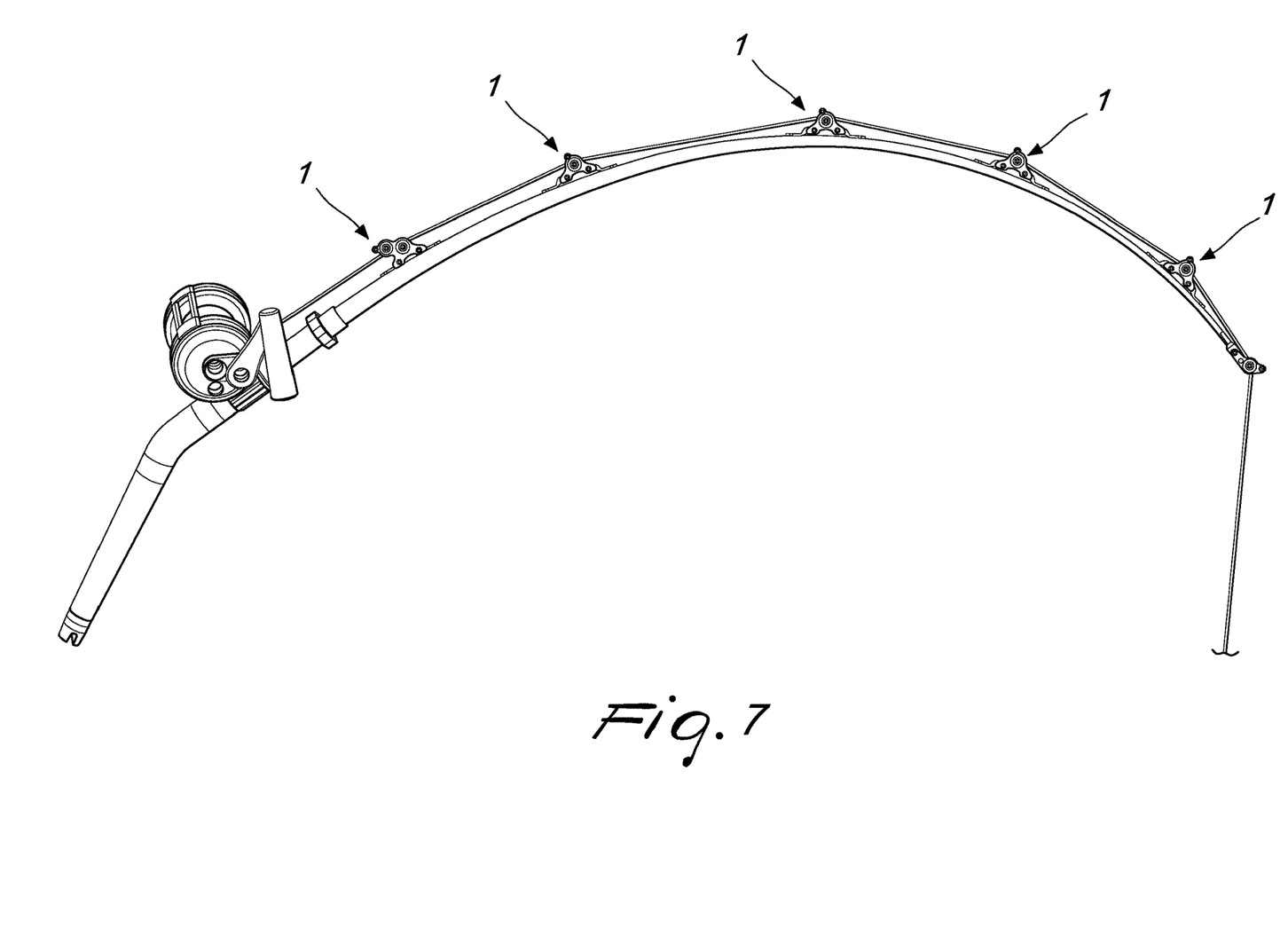
FIG. 7 is a perspective view of a fishing rod line having a plurality of guiding devices in accordance with the guiding device shown in FIG. 1.

Furthermore, the shaft is associated with a plurality of guiding devices 1 for guiding the line, which have the characteristics described above and are arranged between the reel and the tip element.

Use of the guiding device for fishing rod lines, according to the disclosure, is the following.

The guiding devices are fixed to the shaft of the fishing rod in a substantially similar manner to conventional devices.

Having decoupled, with two degrees of freedom, the supporting body 2 of the guiding roller or rollers 5, on which the line acts, from the elements for fixing 3, which are rendered integral with the shaft, allows the rod, during use, to bend over all its length while keeping its elastic response unaltered.

Furthermore, the elements for fixing, being free to rotate and translate during the step of loading and unloading the shaft independently of the bending thereof, prevent any danger of breakage.

In practice it has been found that the disclosure fully achieves the intended aims and advantages.

The disclosure, thus conceived, is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The content of Italian patent application no. 102017000020303 (UA2017A001177), the priority of which is claimed in the present application, is incorporated as a reference.

The invention claimed is:

1. A guiding device for fishing rod lines, the guiding device comprises a supporting body for at least one guiding roller which is mounted so that said at least one guiding roller can rotate with respect to said supporting body about an axis of said at least one guiding roller, and two elements configured for fixing to a shaft of a fishing rod, which are arranged substantially at right angles to said axis of said at least one guiding roller on opposite ends with respect to said supporting body, said guiding device comprising at least one kinematic connection device between said supporting body and at least one of said two elements for fixing which is adapted to allow two degrees of freedom between said supporting body and said at least one of said elements for fixing, said at least one kinematic connection device comprising means of combined rotation and translation of the supporting body with respect to said at least one of said two elements for fixing which are adapted to allow a rotation about an articulation axis that is substantially parallel to the axis of said at least one guiding roller and a translation along a trajectory that lies on a plane that is substantially perpendicular to said axis of said at least one guiding roller, wherein said at least one kinematic connection device comprises an articulation pivot which is connected to said supporting body and extends substantially parallel to said axis of said at least one guiding roller, said articulation pivot being able to slide along a sliding guide which is defined on said at least one of said two elements for fixing.

2. The guiding device according to claim 1, wherein said sliding guide is provided by a slot.

3. The guiding device according to claim 1, wherein said at least one kinematic connection device further comprises a first kinematic connection device and a second kinematic connection device, which are arranged respectively between said supporting body and a respective one of said elements for fixing.

4. The guiding device according to claim 1, wherein said supporting body comprises two side walls, there being provided at least one axle which can be associated detachably with said two side walls, said at least one guiding roller being mounted so that said at least one guiding roller can rotate on said at least one axle.

5. The guiding device according to claim 1, wherein at least one abutment body defines at least one passthrough opening which can be closed by a closure body, said at least one passthrough opening leading into a lubrication chamber which is in contact with at least one bearing.

6. The guiding device according to claim 5, wherein said at least one abutment body comprises a pair of abutment bodies arranged on opposite sides with respect to the at least one guiding roller with which each define a respective passthrough opening of said at least one passthrough opening.

7. The guiding device according to claim 5, wherein said at least one passthrough opening is defined by a hole with a female thread and said closure body comprises a grub screw that can be screwed into and unscrewed from said hole with said female thread.

8. The guiding device according to claim 5, wherein said lubrication chamber can be accessed from outside by way of removal of said closure body.

9. A fishing rod comprising a shaft which is associated, substantially at a first end, with a reel and, substantially at the opposite end, with a tip element, said shaft being associated with a plurality of guiding devices according to claim 1, which are arranged between said reel and said tip element.

* * * * *